March 9, 1965     J. A. DUCEY     3,172,128
WATER SUPPLY SYSTEM FOR WATER CLOSET
Filed June 10, 1963     3 Sheets-Sheet 1
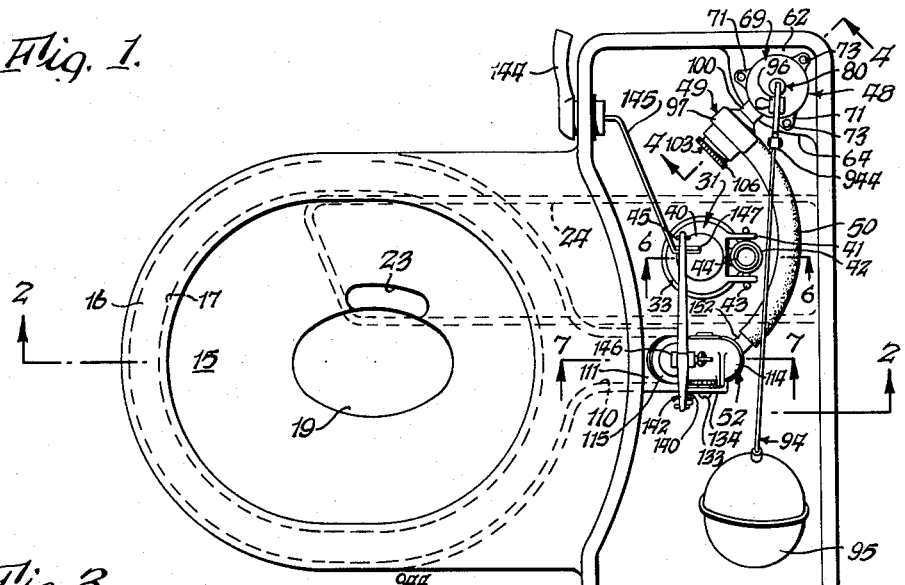
Fig. 1.
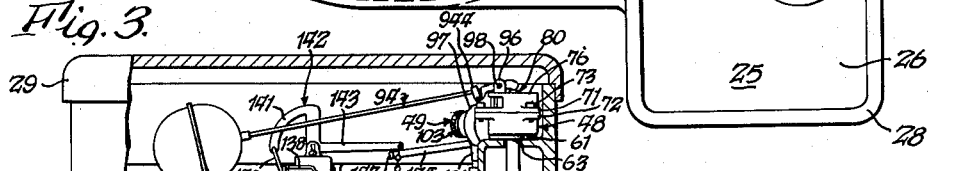
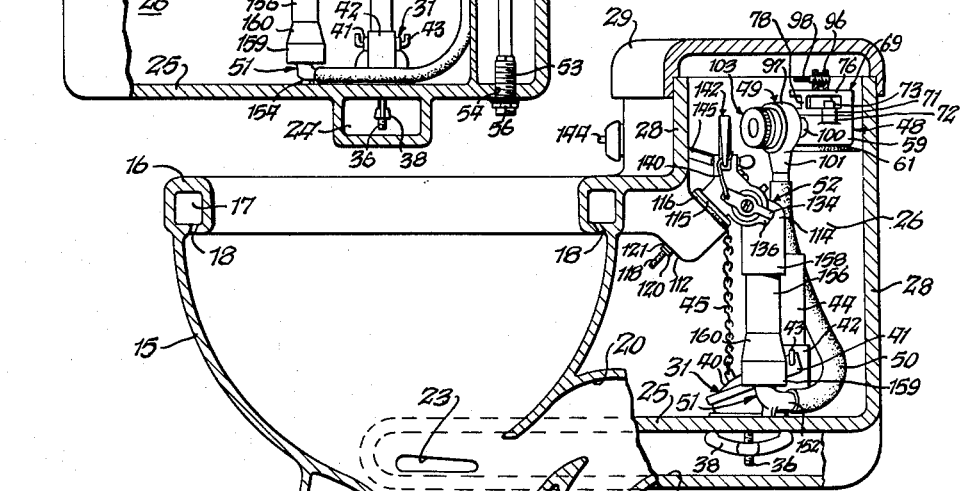
Fig. 3.
Fig. 2.
INVENTOR.
James A. Ducey
BY
Popp and Sommer
ATTORNEYS.

March 9, 1965 J. A. DUCEY 3,172,128
WATER SUPPLY SYSTEM FOR WATER CLOSET
Filed June 10, 1963 3 Sheets-Sheet 2
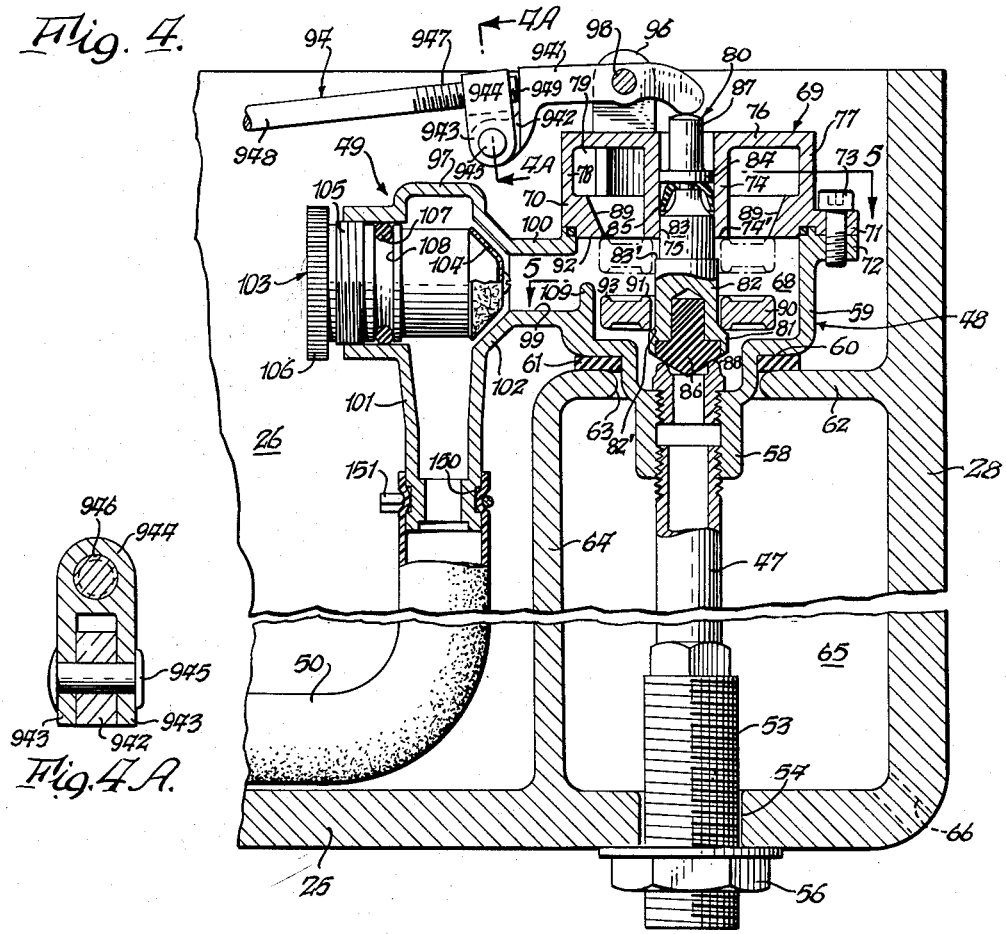
Fig. 4.
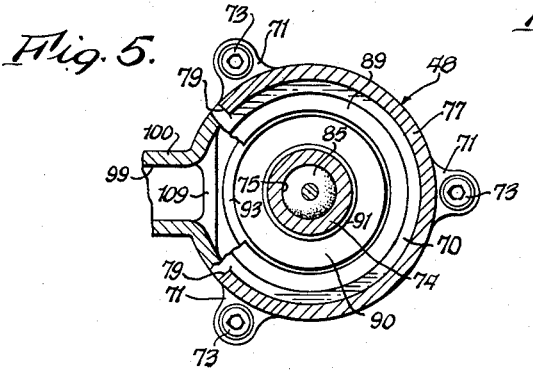
Fig. 4A.
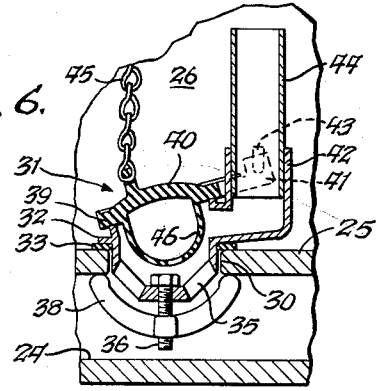
Fig. 5.
Fig. 6.
INVENTOR.
James A. Ducey
BY
Popp and Sommer
ATTORNEYS.

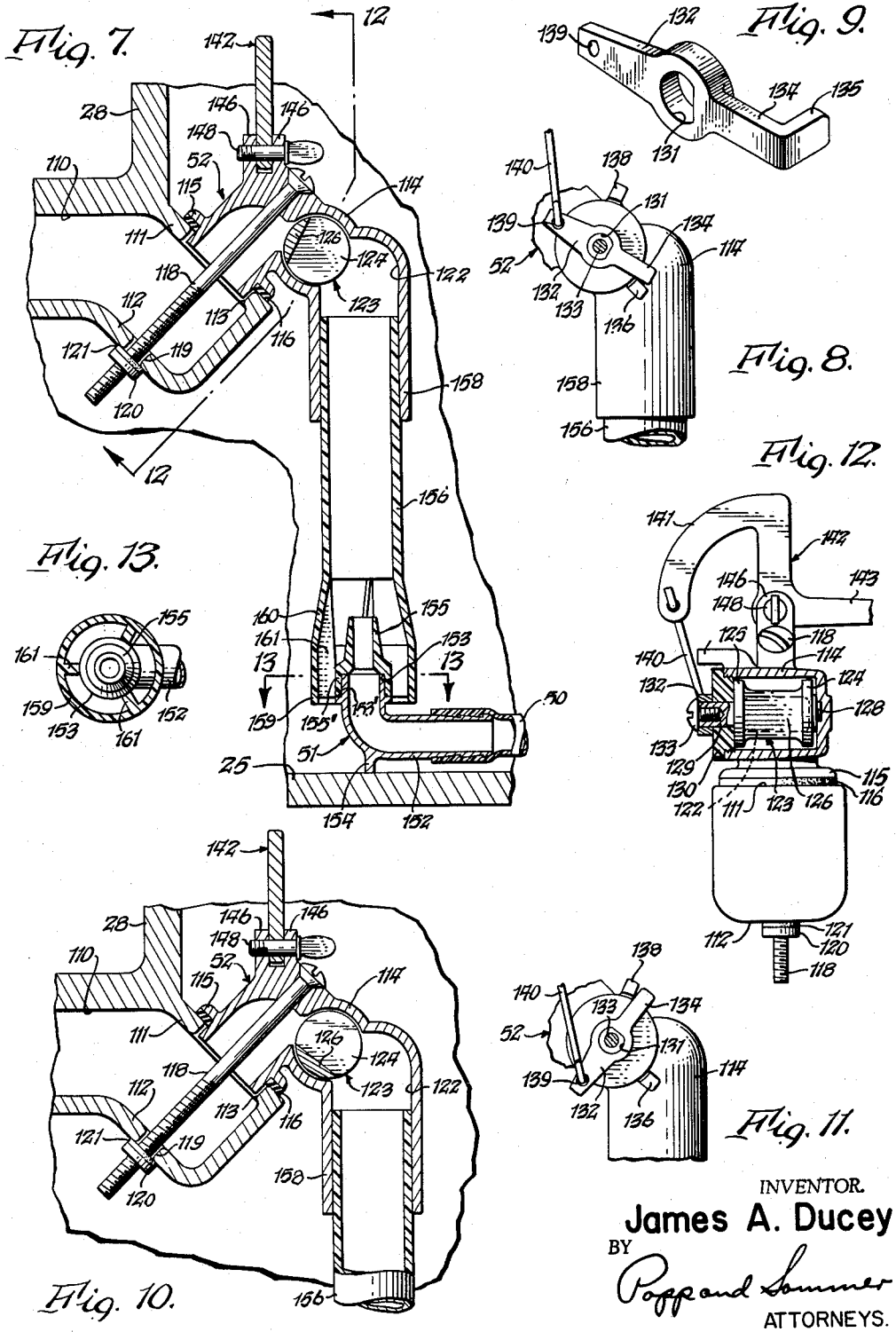

United States Patent Office 3,172,128
Patented Mar. 9, 1965

3,172,128
WATER SUPPLY SYSTEM FOR WATER CLOSET
James A. Ducey, Robinson, Ill., assignor, by mesne assignments, to Case Plumbing Manufacturing Co., Robinson, Ill., a corporation of Illinois
Filed June 10, 1963, Ser. No. 286,773
11 Claims. (Cl. 4—41)

This invention relates to improvements in a water closet and more particularly to improvements in the water supply system for a water closet which has a rim flush.

The primary object of the present invention is to provide a simple, relatively inexpensive and trouble-free construction of apparatus disposed within the tank of the water closet for supplying water to the interior of the hollow bowl rim and also for supplying water to the bowl adjacent its bottom.

Another object is to provide a water supply system for a water closet in which more water is supplied to the rim than is supplied by the ballcock valve during the time of flushing so that a copious washdown of the internal face of the bowl is provided.

Another object is to provide such a water supply system which will provide an adequate rim wash where the water pressure on the inlet side of the ballcock valve is lower than the usual 30 to 40 p.s.i. required, even as low as 15 p.s.i.

Another object is to provide an improved construction of ballcock valve assembly for a water closet which includes an atmospheric vent valve to insure against backsiphonage of water from the closet tank into the water supply pipe which usually carries potable water and thereby prevent its contamination.

Another object is to provide an improved construction of ballcock valve assembly and volume regulator assembly which is low in silhouette and therefore requires little head room within the tank interior.

Other objects and advantages of the present invention will be apparent from the following detailed description of a preferred embodiment thereof shown in the accompanying drawings in which:

FIG. 1 is a top plan view of a water closet constructed and equipped with water supply apparatus in accordance with the present invention, the cover for the closet tank being removed.

FIG. 2 is a vertical, longitudinal sectional view thereof taken generally on line 2—2 of FIG. 1.

FIG. 3 is a fragmentary rear elevational view of the tank portion of the water closet with the wall being broken away to reveal the water supply apparatus within the tank.

FIG. 4 is a fragmentary enlarged sectional view of the ballcock valve assembly and volume regulator assembly, this view being taken on line 4—4 of FIG. 1.

FIG. 4A is an enlarged transverse sectional view of the float lever assembly intermediate its ends, taken on line 4A—4A of FIG. 4.

FIG. 5 is a fragmentary horizontal sectional view of the ballcock valve assembly, taken generally on line 5—5 of FIG. 4.

FIG. 6 is a fragmentary vertical central sectional view of the flush valve and overflow pipe assembly, taken on line 6—6 of FIG. 1.

FIG. 7 is a fragmentary enlarged vertical sectional view of the diverter valve assembly and the jet pump associated therewith, the diverter valve being shown in a closed position, this view being taken generally on line 7—7 of FIG. 1.

FIG. 8 is a fragmentary elevational view of the exterior of the diverter valve assembly when the diverter valve is in its closed position as shown in FIG. 7.

FIG. 9 is a perspective view of a lever shown in FIG. 8 attached to the diverter valve.

FIG. 10 is a fragmentary vertical sectional view similar to FIG. 7 but only of the diverter valve assembly and showing the diverter valve in an open position.

FIG. 11 is a fragmentary elevational view of the exterior of the diverter valve assembly when the diverter valve is in its open position as shown in FIG. 10.

FIG. 12 is a fragmentary, part sectional and part elevational view of the diverter valve assembly, this view benig taken on line 12—12 of FIG. 7.

FIG. 13 is a horizontal sectional view of the jet pump means, taken on line 13—13 of FIG. 7.

The water cioset is shown as having a bowl 15 provided with a hollow rim 16 having an internal passage 17 communicating with a series of circumferentially spaced holes 18 adapted to direct streams of water downwardly against the internal surface of the bowl 15. This bowl is shown as having a well 19 at its bottom connected to the usual up leg 20 and down leg 21 which leads to an outlet 22. Flushing water is supplied to the well 19 through an outlet 23 communicating with a passage 24 arranged below the bottom wall 25 of a tank compartment 26 formed by a circumscribing tank wall 28. The upper open end of the tank wall 28 is shown closed by a removable cover 29.

Referring to FIG. 6, the tank bottom wall 25 is shown as having an opening 30 therein for establishing communication between the tank compartment 26 and the passage 24 leading to the bowl outlet 23. Associated with the opening 30 is a flush valve and overflow pipe assembly indicated generally at 31, which may be of any suitable construction. As shown, it comprises a housing 32 adapted to be clamped against a gasket 33 which surrounds the opening 30 on the upper surface of the bottom wall 25. Part of the housing 32 extends through the opening 30 and is formed with crossed integral arms 35. The intersection of these crossed arms is enlarged and provided with an unthreaded vertical hole through which extends a screw 36 having a head on its upper end bearing against the top of the intersecting portion. The threaded shank of this screw 36 is received in an internally threaded vertical hole provided centrally in a bowed clamping bar 38 arranged below the arms 35. The ends of this clamping bar bear against the lower surface of the tank bottom wall 25.

The housing 32 is shown as having an upwardly facing annular rim 39 which serves as a seat for a pivoted flush valve 40 of any suitable construction. This flush valve is shown as made of rubber and having a pair of arms 41 which extend along opposite sides of an upstanding overflow sleeve 42, the end of these arms being shown as pivotally mounted on hooks 43 supported on this sleeve. An upstanding overflow pipe 44 is shown as received in the sleeve 42. If the level of water within the tank tends to rise above the upper end of the pipe 44 it will overflow into this pipe and through the housing 32 below the flush valve, through the opening 30 into the passage 24 which leads to the bowl 15. The flush valve 40 is raised by a chain lift 45. This flush valve also has the usual dome 46 with perforated bottom which allows the valve to float on the surface of the water as it recedes within the tank compartment 26.

Water is supplied to the water closet through a riser pipe 47 associated with a ballcock valve assembly indicated generally at 48, in turn associated with a volume regulator assembly indicated generally at 49, as shown in FIG. 4. Via the tubing 50 the assembly 49 is associated with a jet pump indicated generally at 51 which in turn is associated with a diverter valve assembly indicated generally at 52, as shown in FIG. 7. The lower end of ther iser pipe 47 is suitably connected to a water supply line (not shown).

Referring again to FIG. 4, the riser pipe 47 is shown as having an externally threaded lower portion 53 which extends through a hole 54 in the bottom wall 25 at one rear corner of the tank. A nut 56 adjustably arranged on the threads of the portion 53 bears against the lower surface of the wall 25. The upper end of the riser pipe 47 is shown as being externally threaded and screwed into a depending nipple 58 formed integrally with a generally cup-shaped ballcock valve body 59. This body has a downwardly facing shoulder 60 which engages a gasket 61 in turn supported on the upper surface of a shelf 62, this shelf having a hole 63 through which the nipple 58 extends. The shelf 62 is preferably integral with the tank wall 28 and also integral with a vertically extending dam wall 64 which joins integrally with the bottom wall 25 and the side wall 28. This enclosure provides a dry compartment 65 having a drain hole 66. Any leakage from the riser pipe 47 cannot collect in the compartment for it will drain through the hole 66.

By tightening the nut 56, it will be seen that the ballcock valve body 59 is clamped downwardly against the shelf 62 and that the opening 63 in the shelf is sealed by the gasket 61. Since the closet walls are usually made of vitreous china, the gasket 61 also cushions the support of the metallic ballcock valve body 59 which is preferably made of brass.

The ballcock valve body 59 has a chamber 68 which is covered at its top by a cap member indicated generally at 69. This cap member is shown as having a lower horizontal plate 70 adapted to engage the rim of the body 59 and this plate has horizontally outwardly extending ears 71 at circumferentially spaced intervals which overlap similar ears 72 formed on the body 59. Each pair of ears is joined together by a screw 73. The cap member is also shown as including a hood or upper horizontal plate 76 integrally joined to the lower plate 70 by a semi-circular vertical side wall 77 and a vertical strut 78 arranged midway between the ends of the side wall 77 thereby to provide a pair of openings 79. These openings preferably face generally toward the center of the tank. The upper plate 76 is shown as having a central integral depending neck 74 which extends downwardly to the horizontal plane of the lower surface 92 of the lower plate 70. The neck 74 is internally formed with a vertical cylindrical hole or bore 75 which extends completely through this neck from its lower end face 74', upwardly through the upper plate 76.

Slidably arranged in the bore 75 of the cap member 69 is a ballcock valve member indicated generally at 80. This valve member 80 may be of any suitable construction but as shown the same comprises a slightly enlarged cylindrical lower head portion 81, a lower cylindrical intermediate portion 82 of slightly smaller diameter thereby forming an upwardly facing annular shoulder 82', an interrupted upper cylindrical intermediate portion of still smaller diameter and having an inner part 83 and an outer part 84, and an upper cylindrical portion 87 of still smaller diameter. An upwardly facing annular shoulder 83' is thus formed between cylindrical portion 82 and part 83. An inverted cup-shaped washer 85 is arranged between the parts 83 and 84 and the rim of this washer sealingly wipes the wall of the bore 75 in the cap member 69. The cylindrical peripheries of the parts 83 and 84 are slidably arranged on the wall for the bore 75. The ballcock valve member 80 is also shown as carrying a rubber valve insert 86 having an exposed downwardly facing conical nose at its lower end adapted to engage an upwardly facing annular seat member 88 which is removably screwed into the internally threaded nipple 58 of the ballcock valve body 59.

The lower plate 70 of the cap member 69 is shown as having a central vertically extending opening 89 into which the lower end of the neck 74 projects and this opening establishes communication between the side wall, openings 79 and the ballcock body chamber 68 and serves as an annular vent opening for the interior of the ballcock body.

An atmospheric vent closure ring 90 is shown as surrounding the lower intermediate portion 82 of the ballcock valve 80 and is axially slidable thereon. This ring is shown as having an inner annular raised ridge or bead 91 adapted to engage the lower flat surface 74' of the neck 74 adjacent the radially inner edge of the annular vent opening 89. The ring 90 is also shown as having an outer annular raised ridge or bead 93 adapted to engage the surface 92 of the vent cap member 69 adjacent the radially outer edge of the annular vent opening 89. The ring 90 preferably has similar ridges 91 and 93 on its lower surface also so that this ring is symmetrical in diametral cross section. This facilitates assembly of the ballcock assembly because the vent ring 90 will operate properly regardless of which ridged surface opposes the cap surface 92. The through hole or bore of the ring 90 is cylindrical and slightly larger in diameter than the valve portion 82 but smaller than the head portion 81 so that the ring may be supported on the annular shoulder 82' of the ballcock 80 and above the floor of ballcock body chamber 68, as shown in FIG. 4.

The upper end of the upper portion 87 of the ballcock valve 80 is convexly rounded and shown as engaged by one end of a float lever assembly indicated generally at 94 the other end of which carries a float 95. The assembly 94 is shown as including a lever 941 extending between a pair of upstanding pivot lugs 96 which carry a transverse pivot pin 98 which extends through a hole in the lever 941 intermediate its ends. One end of the lever 941 extends over and contacts the upper end of the ballcock valve 80. The other end of this lever has a flat-sided offset arm 942 which is straddled by the spaced and parallel lugs 943 of a nut member 944. The arm 942 and lugs 943 have aligned horizontal holes to receive a pivot pin 945, as shown in FIG. 4A. Screwed into the threaded hole 946 of the nut member, and which has its axis generally horizontal, is the externally threaded end portion 947 of a rod 948 which at its other end carries the float 95. The end face of the rod portion 947 opposes an abutment surface 949 on the lever 941 above the offset arm 942.

By screwing the rod 948 in or out of the hole 946, the position of this rod relative to the nut member 944 can be adjusted. This determines the maximum extent to which the rod may pivot about the horizontal axis of the pivot pin 945 in a clockwise direction as viewed in FIG. 4 relative to the lever 941, before the rod engages this lever. Thus the rod 948 is angularly adjustable relative to the lever 941.

Turning the rod 948 so that more of its end portion is exposed between the nut member 944 and abutment surface 949 will produce a lower level of water in the tank. Adjusting the rod 948 relative to the nut member 944 so that there is less rod end exposure, and even eliminating such exposure, will allow water to rise to a higher level in the tank. In this manner the normal level of water in the tank can be simply and easily adjusted as desired without bending the float rod.

When the water in the tank is at a normal level, the float 95 supported thereon will tend to pivot the lever 941 about pivot pin 945 to urge the end of the rod 948 against the abutment surface 949. This in effect locks the rod, nut member and lever together which as a unit then tries to pivot about the pivot pin 98 so as to urge the ballcock valve member 80 downwardly against its seat 88 and thereby shut off the supply of pressurized water to the ballcock body chamber 68.

When the closet is flushed and the level of the water in the tank lowers the float 95 follows and swings the rod 948 in a counterclockwise direction as viewed in FIG. 4 about pivot pin 945. Separation between the rod end and the abutment surface 949 will occur after the lever 941 has been swung in a counterclockwise direction as viewed in FIG. 4 about pivot pin 98 to its maximum driven displacement. This is determined by incoming pressurized water lifting the ballcock valve 80 until its shoulder 83' engages the lower surface 74' on the cap member 69.

When the water level rises during tank refilling the float 95 will first swing rod 948 about pivot pin 945 until the end of the rod engages abutment surface 949, following which the rod and lever 941 will swing unitarily about pivot pin 98. This movement will push the ballcock valve 80 downwardly against its seat 88 and shut off the flow of water into ballcock body chamber 68.

Referring to FIG. 4, it will be seen that the ballcock valve body 59 has a lateral water outlet passage 99 which is formed by an integral tubular extension 100 of this body and having a substantially horizontal axis. The extension 100 is also integrally formed with the hollow body 97 of the volume regulator assembly 49 which is shown as having a silhouette no higher than, and actually lower than ballcock valve assembly 48 and an enlarged central portion joined to the lateral extension 100 through a conical section 102. An integral nipple or pipe 101 is shown as extending downwardly from the enlarged central body portion adjacent section 102.

The inner surface of the section 102 may be considered as providing a seat for a horizontally movable volume regulator valve member indicated generally at 103. This member 103 is shown as having a conical inner end faced with a leather gasket 104, an externally threaded intermediate portion 105 threadedly engaged with an internally threaded opening provided in the body 97, and an outer knob portion 106 which is preferably externally knurled to facilitate manipulation. An O-ring 107 is arranged in a groove 108 provided in the stem of the valve member 103 inwardly of but adjacent to the externally threaded portion 105 thereof. This O-ring bears against the internal surface of the body 97 and seals against the leakage of water past the threads 105. Thus the volume regulator valve member 103 is rotatably adjustable along a substantially horizontal axis in valve body 97. This reduces headroom requirement for this regulator.

A weir or dam wall 109 extends transversely of the outlet passage 99 and is preferably integrally formed with the ballcock body 59 and is located at the upstream end of the lateral extension 100 or adjacent the chamber 68. The purpose of this weir 109 is to make in effect a ballcock seat at a higher level than the floor or bottom of the passage 99. Thus, if water were allowed to stand on the floor of the passage 99 and back-siphonage occurred within the riser pipe 47, this standing water might conceivably be drawn into the riser pipe. To prevent this occurring the transverse weir 109 serves as a barrier to dam any such standing water from flowing toward the riser pipe 47.

Referring to FIG. 1, the passage 17 of the hollow rim has a central supply branch 110 adjacent the tank compartment 26. The rear end of this branch passage 110 is shown in FIG. 7 as having downwardly and rearwardly inclined upper and lower walls 111 and 112, respectively. The upper inclined wall 111 is shown as provided with an opening 113 to which one end of the elbow-shaped diverter valve body 114 of the assembly 52 is connected. For this purpose, the body 114 is shown as having an annular flange 115. A gasket 116 is arranged between this flange and the outer surface of the inclined upper wall 111. The diverter valve body 114 is clamped down against the gasket and the gasket 116 in turn against the wall 111 by a screw 118 which has a head at one end bearing against the diverter valve body 114 and a shank which extends through a hole in this body and transversely of the branch supply passage 110 and penetrates a hole 119 provided in the lower inclined wall 112. The lower end portion of the shank of the screw 118 is externally threaded and a nut 120 is arranged on this threaded portion externally of the inclined wall 112. A gasket 121 is interposed between this nut 120 and the outer surface of the inclined wall 112. By tightening the screw 118, it will be seen that the diverter valve body 114 is drawn into a firmly sealed mounting so as to establish communication between the branch passage 110 and the through passage 122 which extends through the body 114 from end to end thereof.

Intermediate its ends, the body 114 is formed to house and pivotally support a diverter valve member 123 which comprises a pair of horizontally spaced end walls 124 and 125 connected by a closure plate 126. This closure plate 126 is adapted substantially to close off the passage 122 in the body 114, as shown in FIG. 7 or to be moved to a position where it no longer obstructs the passage 122, as shown in FIG. 10.

Referring to FIG. 12, the diverter valve has a spindle including an inner end portion 128 which is journalled in a suitable recess provided in the side wall of the body 114. This spindle also includes an outer portion 129 which extends through and is journalled in a hole provided in a cover 130. This cover 130 has a threaded connection with the body 114 and the exposed periphery of this cover is preferably knurled to facilitate grasping the same when loosening or tightening it. The outer end of the outer spindle portion 129 is formed with a chordal flat or other suitable out-of-round cross sectional shape, which is received in a similarly shaped hole 131 formed in the hub of a lever 132. This lever is held in position on the spindle part 129 by a retainer screw 133.

The lever 132 has a radial arm 134 and a laterally turned or axially extending stop finger 135 adapted to move upon oscillation of the lever in an arcuate path outside the periphery of the cover 130. As shown in FIGS. 8 and 11, the fingered arm 134 is adapted to engage a first or lower stop 136 when the diverter valve 123 is in the closed position shown in FIG. 7, as depicted in FIG. 8, and is also adapted to engage a second or upper stop 138 when the diverter valve is in the open position shown in FIG. 10, as depicted in FIG. 11. The lugs 136 and 138 are preferably formed integrally with the body 114.

The outer end of the lever 132 is shown provided with a hole 139 having an axis parallel to that of the hole 131 therein to receive the hooked lower end of a wire link 140 as illustrated in FIGS. 8, 11 and 12. Thus a simple and troublefree pivotal connection between lever 132 and link 140 is provided. The upper end portion of this wire link 140 is offset and passes through a hole in the end of a weighted arm 141 of a diverter valve actuating lever represented generally by the numeral 142 and thereby provides a pivotal connection. This lever also includes a control arm 143 which extends generally horizontally as shown in FIG. 3. The extremity of the control arm 143 is suitably connected to the upper end of the chain 45 leading to the flush valve 40. The lever 142 is pivotally mounted on the diverter valve body 114. For this purpose, this body is shown as provided with a pair of spaced upstanding pivot lugs 146 which carry a transverse pivot pin 148 which passes through a hole provided in the lever 142 intermediate the arms 141 and 143 thereof. The front wall portion of the tank wall 28 mounts in any suitable manner a pivotal flushing trip lever 144 which is formed interiorly of the tank with a lift arm 145. The extremity of this lift arm is bent laterally at 147 to extend under and operatively engage the control arm 143.

The lever 142 is so constructed that the weighted arm 141 tends to rotate this lever in a counterclockwise direction as viewed in FIGS. 3 and 12. However, the lever is prevented from turning in this direction by reason of the chain 45 holding it stationary. The lower end of this chain is anchored to the flush valve 40 and the weight of this valve produces a torque on the lever 142 to overcome the countertorque produced by this lever's weighted arm 141. Moreover, the head of any water over the flush valve 40 when seated will hold it against its seat and thus assure that the lever 142 remains in its untipped position illustrated in FIGS. 3 and 12. When in this position, the diverter valve will be in its closed position shown in FIG. 7 and depicted in FIG. 8.

As illustrated in FIG. 4, water discharged through the outlet passage 99 flows through the space between the volume regulator valve gasket 104 and opposing regulator body portion 102 into the discharge nipple 101. One end of the flexible tubing 50 is suitably secured to the lower end of this nipple. For this purpose, the nipple is shown as provided with an external annular groove 150 over which the end of the tubing 50 extends. A split wire clamp 151 is shown as surrounding the tubing 50 and forcing the intermediate portion thereof into the groove 150.

As illustrated in FIG. 7, the other end of the tubing 50 is shown as connected to the jet pump 51. This pump is shown as comprising an elbow-shaped tube having a horizontal part 152 and an upturned vertical part 153. The tube is supported on the tank floor 25 by a foot 154. The tubing 50 is shown as embracing the free end portion of the horizontal inlet part 152.

A nozzle 155 is shown mounted on the vertical part 153. For this purpose the nozzle has a sleeve portion 155' which embraces the part 153 and rests on an external upwardly facing annular shoulder 153' formed on this part. The nozzle 155 is arranged to discharge water upwardly into a tube 156. The upper part of this tube is preferably cylindrical and is slidably received in but frictionally held by the downturned portion 158 of the diverter valve body 114. Thus the body portion 158 and tube 156 have a telescopic connection. The lower end portion of the tube 156 is shown as having an enlarged cylindrical configuration as indicated at 159. This lower part 159 is connected by an integral conical transition section 160 to the main part of the tube 156. The intermediate conical part 160 surrounds the nozzle 155 in radially spaced relation thereto, as also does the lower enlarged cylindrical part 159 with respect to the sleeve portion 155'. In order to maintain such radial spacing, a series of radial circumferentially spaced, vane-like webs 161 extends between the nozzle sleeve portion 155' and the lower cylindrical part 159 and conical part 160 of the tube 156. Preferably as shown, the nozzle 155, tube 156 and webs 161 are formed as a unitary structure molded from a suitable plastic material.

The purpose of the telescopic connection between the upper end of the tube 156 and the diverter body part 158 is to allow for vertical adjustment between these elements to accommodate dimensional differences in different vitreous chine closets and yet allow the nozzle 155 to sit on the shoulder 153' of the jet pump elbow.

Operation

Assuming that a body of flushing water is present in the tank having a level determined by the position of the float 95 but at some point below the upper end of the overflow pipe 44, the water supply system will operate in the following manner. When the user trips the lever 144, the inner arm 145 lifts the control arm 143 on the lever 142 to rotate the latter in a counterclockwise direction as viewed in FIGS. 3 and 12. The link 140 is pushed down thus swinging the diverter valve lever 132 from its position illustrated in FIG. 8 to that illustrated in FIG. 11, the latter position being limited by engagement between the fingered arm 132 and upper lug 138. The aforesaid counterclockwise movement of lever 142 also lifts the chain 45 and the flush valve 40, opening the latter and allowing water to drain out of the tank compartment 26 into the passage 24 leading to the bowl 15. As soon as the flush valve 40 lifts off its seat 39 the air trapped within the bowl 15 will tend to float this valve or maintain it in an open condition. Even though the lift arm 145 may have returned to its original lower position, occasioned by release of the trip lever 144, the diverter valve lever 142 will still remain tipped, keeping the diverter valve 123 in its open position shown in FIG. 10.

As water drains from the tank compartment 26, its level lowers causing the float 95 to lower. This rotates the float rod 948 in a counterclockwise direction about the axis of the pivot pin 945 as viewed in FIG. 4. Pressure of water in the riser pipe 47 against the lower end of the ballcock valve 80 will cause this valve to move upwardly and open, forcing the lever 941 to remain in contact with and follow the rod 948 by pivoting about the axis of pivot pin 98 until shoulder 83' engages surface 74'. At this time the ballcock valve 80 is in its fully unseated or open position.

Separation of the ballcock valve 80 from its seat 88 allows pressurized water to flow into the ballcock chamber 68. The flow and pressure of this incoming water will force the atmospheric vent ring 90 upwardly against the bottom surface 92 of the cap member 69 so as to seal the vent opening 89 therein. Such a position of the vent ring 90 is shown by broken lines in FIG. 4. The water escapes from the ballcock compartment 68 over the weir 109 into the outlet passage 99, through the space between the gasket 104 and the opposing surface of the regulator body portion 102 into the discharge nipple 101. The water thence flows through the tubing 50 into the jet pump 51, being discharged upwardly from the nozzle 155 thereof into the tube 156. The water discharged by the nozzle 155 has sufficient pressure to carry the flow of water upwardly into the diverter valve passage 122 past the now open diverter valve 123 and into the supply branch 110 leading to the interior 17 of the hollow rim flush. The water is discharged through the openings 18 against the inner surface of the bowl 15.

The action of the jet of water discharged by the nozzle 155 is such as to suck in or aspirate water from the body of water present in the tank compartment 26, the jet pump 51 and associated mechanism being still submerged in this body of water. This sucked in or aspirated water flows upwardly through the passages between webs 161. In this manner more water is supplied to the hollow rim during the time of flushing than is supplied solely by that which is discharged by the nozzle 155. Accordingly, effective rim washdown is not directly dependent upon water supply pressure in the riser pipe 47.

The level of water in the tank compartment 26 will drop until the flush valve 40 lowers by gravity and eventually reseats. When this occurs the chain 45 will be pulled down, causing the diverter valve lever 142 to rotate in a clockwise direction as viewed in FIGS. 3 and 12. This will cause the diverter valve to return to its closed position shown in FIG. 7. In such position, the passage 122 is materially blocked so that only a small amount of water discharged by the nozzle 155 can flow into the branch supply conduit 110 for resealing the well of the bowl. Rather, the major amount of water is turned to flow in a reverse direction downwardly along the outside of the nozzle 155, past the spacer webs 161 into the tank compartment 26. In this manner, the tank compartment is replenished with water. With the flush valve 40 reseated and with the water from the nozzle 155 entering the tank compartment 26, the level of water will rise with the float 95 riding thereon and gradually rotating the float rod 948 in a clockwise direction about pivot pin 945 as viewed in FIGS. 3 and 4. This action of the rod continues until the lever 941 is engaged and urged to rotate in a clockwise direction about its pivot pin 98 whereby this lever gradually moves the ball cock valve 80 downwardly toward its seat 88. This closing action of the ballcock valve continues until it is firmly pressed against the seat, thereby shutting off further supply of water to the tank interior.

From the foregoing, it will be seen that the various stated objects of the invention have been accomplished. The embodiment shown is intended to be illustrative rather than limitative of the present invention, the scope of which is to be measured by the appended claims.

What is claimed is:

1. In a ballcock assembly for a water closet, the combination comprising a hollow valve body having an annular seat surrounding a water inlet passage and a lateral water outlet passage in its side, a valve movable with respect to said seat, the floor of said outlet passage being disposed above said seat, and a weir extending transversely of said outlet passage and having an upper edge arranged above said floor.

2. In a ballcock assembly for a water closet, the combination comprising a valve body having a chamber, a substantially vertical water inlet passage in the bottom of said body and communicating with said chamber and a substantially horizontal water outlet passage in the side of said body and communicating with said chamber, a movable valve for regulating the flow of water through said inlet passage, the floor of said outlet passage being disposed above the upper end of said inlet passage, and a weir extending transversely of said outlet passage and having an upper edge arranged above said floor.

3. The combination as set forth in claim 2 wherein said weir is arranged adjacent said chamber.

4. In a ballcock assembly for a water closet, the combination comprising a valve body having a chamber open at its top, a water inlet passage in the bottom of said body and communicating with said chamber and a lateral water outlet passage in the side of said body and communicating with said chamber, a vent cap member removably mounted on said body and covering said chamber and having a flat bottom surface and an arcuate atmosphere vent passage opening to said surface, a valve member slidably mounted on said cap member for movement along an axis generally concentric to said vent passage and regulating the flow of water through said inlet passage, a vent closure ring surrounding and slidably arranged on said valve member and having a surface opposing said cap surface, said ring surface having radially spaced raised annular ridges normally spaced from said cap surface so as not to obstruct communication between said vent passage and chamber but said ridges being adapted to be pressed upwardly into contact with said cap surface on opposite radial sides of said vent passage to close the same by water flowing through said inlet passage into said chamber, said ring being symmetrical in diametral cross section.

5. In a water closet including a tank, the combination therewith of a ballcock and volume regulator assembly of low silhouette requiring little head room within the interior of said tank, said ballcock valve assembly including a hollow ballcock valve body having a substantially horizontal water outlet passage in its side, and said volume regulator assembly including a hollow volume regulator valve body having a silhouette no higher than said ballcock valve assembly and joined to said ballcock valve body through a conical seat at the downstream end of said outlet passage and also having a downwardly directed discharge pipe adjaent said seat, and a regulator valve member rotatably adjustable along a substantially horizontal axis in said regulator valve body and cooperable with said seat to regulate the flow of water into said pipe.

6. In a water closet having a tank and a hollow bowl rim, the combination therewith of a conduit having one end communicating with the interior of said rim and its other end arranged adjacent the bottom of said tank, a nozzle arranged within said other end of said conduit so as to leave a space therebetween communicating with the interior of said tank, ballcock means for supplying pressurized water to said nozzle, a diverter valve operatively arranged in said conduit and normally in a closed position but movable to an open position, said diverter valve when in said closed position substantially closing off water flow through said conduit into said rim interior but when in said open position allowing water flow through said conduit into said rim interior, a flush valve at the bottom of said tank, selectively operable means to open said diverter and flush valves substantially simultaneously, and means operatively connecting said valves to close said diverter valve as said flush valve closes, said space being submerged when a body of flushing water is maintained in said tank whereby discharge of water from said nozzle into said conduit will operate to aspirate additional water into said conduit when said diverter valve is open but such discharged water will flow into said tank when said diverter valve is closed.

7. The combination as set forth in claim 6 in which said other end of said conduit is enlarged and said nozzle has spacer lugs projecting outwardly a substantially uniform distance toward said conduit whereby said conduit surrounds said nozzle and is substantially uniformly spaced therefrom.

8. In a water closet having a tank and a hollow bowl rim, the combination therewith of a generally elbow-shaped diverter valve body having a water flow passage therethrough from end to end, means for mounting one end of said body on said water closet to establish communication between said passage and the interior of said rim, controlled means for supplying water to the other end of said passage, a diverter valve pivotally mounted on said body intermediate its ends and normally in a closed position in which said passage is substantially blocked, a first lever fast to said diverter valve for pivoting the same, a second lever fulcrumed intermediate its ends on said body above said first lever and having a weighted arm on one side of said fulcrum and a control arm on the other side of said fulcrum, a link interconnecting said weighted arm and first lever, a flush valve in the bottom of said tank, means operatively connecting said control arm and flush valve, and selectively operable means for lifting said control arm.

9. In a water closet including a hollow bowl rim and a tank having a bottom, the combination therewith of a generally elbow-shaped diverter valve body having a water flow passage therethrough from end to end, means for mounting one end of said body on said water closet to establish communication between said passage and the interior of said rim, a diverter valve movably mounted on said body intermediate its ends, the other end of said body being downturned, and controlled means for supplying water to said downturned end including an upright tube the upper end of which telescopically engages said downturned end and a nozzle arranged in the lower end of said tube in spaced relation thereto and supported on said bottom.

10. In a water closet including a hollow bowl rim and a tank having a bottom, the combination therewith of a generally elbow-shaped diverter valve body having a water flow passage therethrough from end to end, means for mounting one end of said body on said water closet to establish communication between said passages and the interior of said rim, a diverter valve movably mounted on said body intermediate its ends, the other end of said body being downturned, and controlled means for supplying water to said downturned end including an upright tube the upper end of which telescopically engages said downturned end, a nozzle arranged in the lower end of said tube in spaced relation thereto, circumferentially spaced webs extending between said tube and nozzle, said tube, nozzle and webs being a unitary member, and an elbow-shaped tubular element supported on said bottom and having an upstanding part and an upwardly facing support surface, said nozzle being coupled to said part and said unitary member resting on said support surface.

11. In a water closet including a tank, a ballcock valve assembly arranged in said tank and having a body and a valve movable vertically on said body, the combination therewith of means arranged to operate said valve in response to the level of water in said tank, said means comprising a lever mounted intermediate its ends on said body for pivotal movement about a generally horizontal first axis, one end of said lever being arranged to engage said valve, an offset arm on the other end of said lever to provide an abutment surface thereon above said arm, a nut member mounted on said arm for pivotal movement about a generally horizontal second axis and having a threaded hole at one end facing said surface, a rod having a threaded portion at one end adjustably screwed into said hole and having an end face adapted to engage said surface, and a float mounted on the other end of said rod.

References Cited in the file of this patent

UNITED STATES PATENTS

| | | |
|---|---|---|
| 2,088,864 | McGrath | Aug. 3, 1937 |
| 2,164,934 | McGrath | July 4, 1939 |
| 2,299,706 | Svirsky | Oct. 20, 1942 |
| 2,412,760 | Svirsky | Dec. 17, 1946 |
| 2,558,471 | Whitlock | June 26, 1951 |
| 2,635,622 | Owens | Apr. 21, 1953 |
| 2,773,267 | Kohlmeyer | Dec. 11, 1956 |